United States Patent [19]

Craft

[11] Patent Number: 5,386,296
[45] Date of Patent: Jan. 31, 1995

[54] CHROMA BURST DETECTION SYSTEM

[75] Inventor: Jack Craft, Bridgewater, N.J.

[73] Assignee: Samsung Electronics Co., Ltd., Kyungki, Rep. of Korea

[21] Appl. No.: 210,416

[22] Filed: Mar. 18, 1994

Related U.S. Application Data

[63] Continuation of Ser. No. 967,424, Oct. 28, 1992, abandoned.

[51] Int. Cl.[6] .............................................. H04N 9/79
[52] U.S. Cl. .................................... 358/316; 348/647
[58] Field of Search ............... 358/315, 316, 318, 310; 348/645, 647; H04N 9/79

[56] References Cited

U.S. PATENT DOCUMENTS

| | | | |
|---|---|---|---|
| 3,610,955 | 10/1971 | Blaser et al. . | |
| 3,833,823 | 9/1974 | Cecchin et al. | 358/27 |
| 3,949,414 | 4/1976 | Hayashi | 358/27 |
| 3,958,170 | 5/1976 | Hodgson | 328/26 |
| 4,007,485 | 2/1977 | Sato | 358/316 |
| 4,092,667 | 5/1978 | Akagawa et al. | 358/27 |
| 4,321,618 | 3/1982 | Hirose et al. | 358/316 |
| 4,343,018 | 8/1982 | Niimura et al. . | |
| 4,373,140 | 2/1983 | Chin | 307/351 |
| 4,373,141 | 2/1983 | Sanders | 307/351 |
| 4,523,105 | 6/1985 | Jose et al. . | |
| 4,524,380 | 6/1985 | Shibata et al. | 358/316 |
| 4,564,814 | 1/1986 | Miura et al. . | |
| 4,571,502 | 2/1986 | Kimura et al. | 328/26 |
| 4,612,585 | 9/1986 | Takase et al. | 358/316 |
| 4,941,080 | 7/1990 | Sieborger et al. . | |
| 5,012,139 | 4/1991 | Susak et al. | 328/26 |
| 5,113,262 | 5/1992 | Strolle et al. | 358/310 |

OTHER PUBLICATIONS

"Boost precision rectifier BW above that of op amp used", Jerald Graeme, *Electronic Design News*, Jul. 5, 1974, pp. 67–69.

"Measure differential ac signals easily with precision rectifiers", Jerald Graeme, *Electronic Design New*, Jan. 20, 1975, pp. 45–48.

"Ac-to dc converters for low-level input signals", Robert Kreeger, *Electronic Design News*, Apr. 5, 1973, pp. 60–62.

*Primary Examiner*—Tommy P. Chin
*Assistant Examiner*—Thai Tran
*Attorney, Agent, or Firm*—Sughrue, Mion, Zinn, Macpeak & Seas

[57] ABSTRACT

A video cassette recording (VCR) playback system includes circuitry for separating the components of a video signal to produce luminance information and color-under information. The separated color-under information is applied to the input of a variable gain control amplifier the output signal from which includes burst information at color-under carrier frequency during burst intervals. The output signal from the variable gain amplifier is applied to a rectifying circuit which is enabled during the burst interval. The burst information at color-under carrier frequency is rectified during the burst interval and peak detected to produce a control voltage which is applied to the variable gain control amplifier for controlling its gain.

11 Claims, 5 Drawing Sheets

CHROMA BURST DETECTION SYSTEM

This is a continuation of application Ser No. 07/976,424 filed Oct. 28, 1992 now abandoned.

This invention relates to a video cassette recorder (VCR) and, more particularly, to the control of the amplitude of color-under signals therein.

BACKGROUND OF THE INVENTION

In VHS recording, the luminance and chrominance information contained in a composite video signal are separated from each other. The chrominance information supplied for recording is mixed with one of four phases of a 4.21 MHz carrier in a down conversion that generates a color-under signal that comprises quadrature-amplitude-modulation (QAM) sidebands of a suppressed color-under carrier with a nominal frequency of 629 kHz. The phasing of the 4.21 MHz carrier wave is selected on a line-by-line basis, the selection signal being generated by decoding counts of the horizontal and vertical synchronizing pulses separated from the composite video signal. The luminance information is used to frequency-modulate a higher frequency luminance carrier wave. In the resulting FM signal the sync tips are at about 3.4 MHz; black level is at about 3.7 MHz; and white level is at about 4.4 MHz. This FM signal is added to the color-under sidebands as a bias frequency, and the resulting sum signal is pre-emphasized and used to record the video tape vertically scanned by the VCR type transport.

The playback electronics of known VCRs include filtering that separates the signal reproduced from the electromagnetic tape into two components. The component separated by a high-pass or band-pass filter is a luma carrier frequency-modulated in accordance with luminance and synchronizing signals; and the gain of the luminance and synchronizing signals recovered by demodulating the frequency-modulated luma carrier depends on the frequency-deviation of the carrier, rather than on its amplitude. The component separated by a low-pass filter is the color-under signal. Color saturation depends on the amplitude of the color-under signal, because the color-difference signals are derived by demodulating suppressed-carrier QAM sidebands recovered by upconverting the color-under signal. So, in order properly to track color-difference signals derived from the color-under signal with recovered luminance signal, the color-under signal is passed through a variable gain control amplifier, the gain of which is controlled by an automatic gain control (AGC) loop responding to the amplitude of color burst. This type of AGC loop is sometimes more specifically referred to as an automatic color control (ACC) loop. In known VCRs the amplitude of color burst is detected after the color-under signal is up-converted to the normal chrominance band, centered at 3.58 MHz in a VCR for recording NTSC television signals. The reproduced chrominance signal is combined with the reproduced luminance signal to form a composite signal that can be supplied to a television receiver, either directly or as modulate onto a radio-frequency picture carrier.

In newer types of VCRs, such as one of the type generally described in U. S. Pat. No. 5,113,262 entitled VIDEO SIGNAL RECORDING SYSTEM ENABLING LIMITED BANDWIDTH RECORDING AND PLAYBACK issued May 12, 1992 to C. H. Strolle et alii, time-base correctors are used for the luminance signal, as demodulated from the frequency-modulated luma carrier, and for the color-under signal. These time-base correctors employ digital memory, written in accordance with a time-base derived from the signals recovered during playback of the tape, and read in accordance with a more stable time-base so that transversal digital filtering can be done over adjacent scan lines. The luminance signal and the color-under signal must be digitized before they can be written into the digital memory; and in order effectively to utilize the limited number of bits of resolution (e.g., eight) in a cost-effective analog-to-digital converter, it is a practical necessity to gain-control the color-under signal prior to its digitization. The variable delay time base correction and the large number of processing steps between the analog-to-digital converter and the up-conversion of the color-under signal to the normal chrominance band for composite video signal tend to cause tracking problems in an ACC loop detecting burst amplitude after that up-conversion, the inventor's co-workers found.

The inventor's co-workers considered locating a digital-to-analog converter and a up-converter just for implementing ACC after the analog-to-digital converter, but before the time-base corrector. However, the up-converter requires filtering to reject image frequencies. Practically speaking, such filtering requires the use of inductive elements, which are better avoided, particularly when monolithic integrated circuitry is to be used in the playback electronics inasfar as possible.

The inventor's co-workers considered performing the up-conversion and filtering in the digital regime, followed by digital-to-analog conversion of the ACC signal. This was found to be undesirable since it required clocking frequencies higher than those needed for digitizing and digitally filtering the limited-bandwidth luminance and color-under signals recovered during playback from recorded video tape.

Accordingly, an ACC loop detecting burst amplitude directly from the color-under signal without up-conversion was sought by the inventor for use in VCR playback electronics. Implementing such an ACC loop is not straight-forward design, however. In the prior art ACC scheme, up-conversion produces a chroma reference signal, or color burst, having a prescribed number of cycles (i.e., eight or nine) during a chroma burst interval which can readily be synchronously detected to provide accurate detection of the level to which the amplitudes of the color-difference signals should be referred. In-order to eliminate the up-conversion used in the prior art, the inventor perceived, a detector circuit was needed which could produce an accurate representation of the amplitude of the amplifier output by sensing and/or rectifying the cycle and a part in each of the down-converted color bursts and still be capable of producing an output suitable for controlling the gain of the ACC'd amplifier. The inventor could find no such detector in the prior art. In order to realize the system invention herein described and claimed, the inventor developed a new signal detection circuitry which can accurately detect the amplitude of very few cycles of low-amplitude signals. This signal detection circuitry is described herein and in an application entitled CLIPPER CIRCUITRY filed before the U.S. Patent and Trademark Office on even date herewith, which application claims the new signal detection circuitry.

SUMMARY OF THE INVENTION

In video tape playback electronics embodying the invention, up-conversion of the gain-controlled color-under signal produced at the output of the variable gain control amplifier is eliminated as a pre-requisite for developing ACC signal. The output signal of the variable gain control amplifier is applied either directly or via an amplifier to a detector and rectifying circuit, the rectified output signal from which then controls the gain of the variable gain control amplifier.

DETAILED DESCRIPTION

Figure 6:
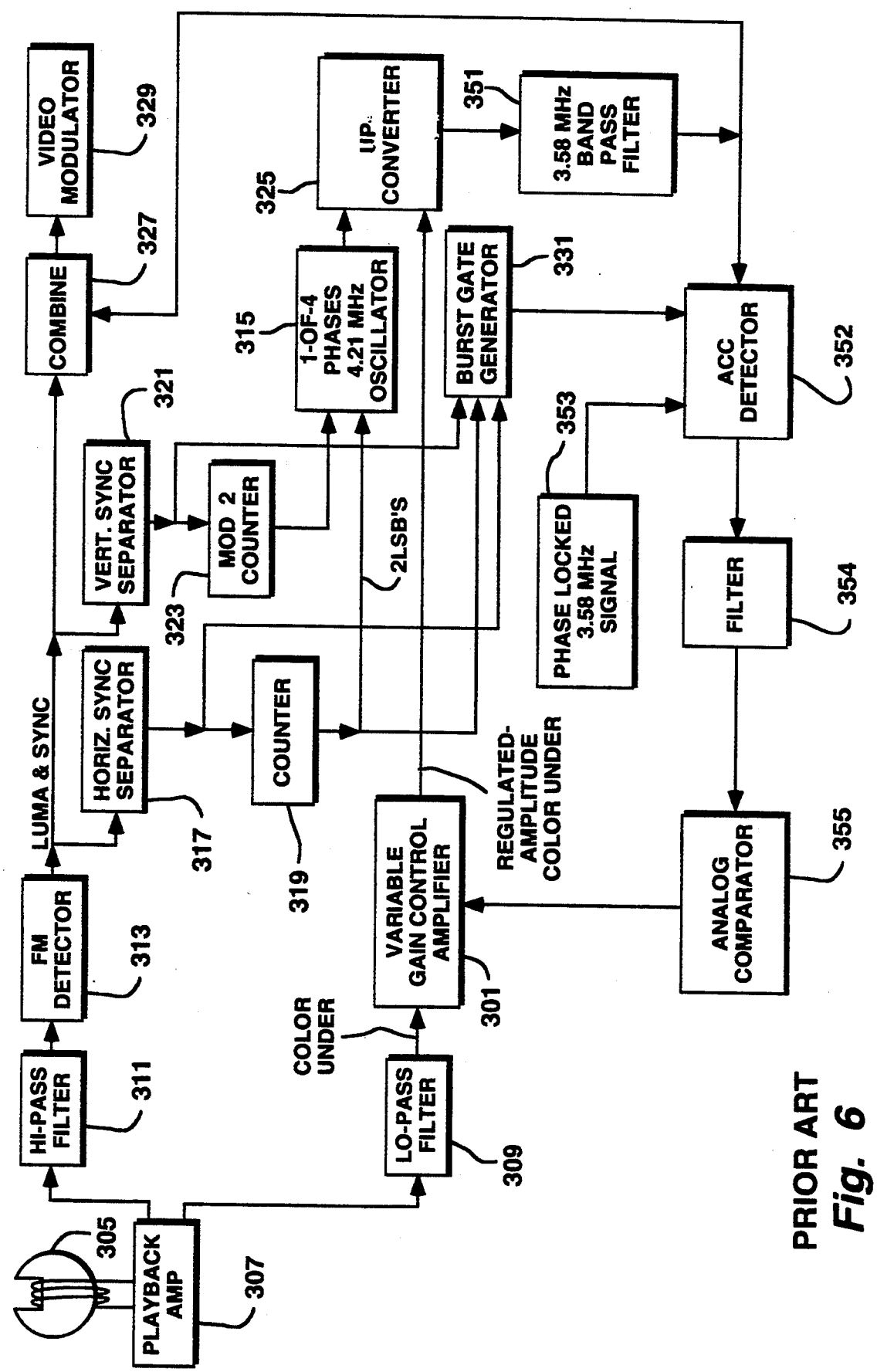
FIG. 6 is a block diagram of a portion of a prior art playback system for a video cassette recorder (VCR) of the VHS type.

FIG. 6 depicts a portion of the playback circuit of a VCR in accordance with the prior art. Playback signal generated by the passage of a video tape past a head assembly 305 is supplied to a playback amplifier 307. An amplified playback signal is supplied from the playback amplifier 307. This amplified playback signal is supplied to a high-pass filter 311, which separates luminance or "luma" information therefrom for demodulation by an frequency-modulation detector 313, and to a low-pass filter 309, which separates chrominance or "chroma" information therefrom for application to the input of a variable gain control amplifier 301. The separated chroma information supplied to the variable gain control amplifier 301 is in color-under format, including reference color burst signals at the 629 kHz color-under carrier frequency and line information concerning color-difference signals down-converted during recording from chrominance sidebands with a suppressed 3.58 MHz subcarrier. The color-under output signal from the amplifier 301, which includes corresponding reference color burst signals and line information concerning color-difference signals, is applied to an input of an up-converter 325. Another input to the up-converter 325 is a carrier wave signal from a 4.21 MHz oscillator 315. Up-converter 325 heterodynes color-under sidebands from the variable gain amplifier 301 with one of four phases of the 4.21 MHz carrier wave cyclically supplied from oscillator 315, thereby regenerating at its output the chrominance sidebands with a suppressed 3.58 MHz subcarrier and image sidebands. The output of up-converter 325 is applied to the input of a 3.58 MHz bandpass filter 351, which separates the chrominance sidebands from the image sidebands. A linear combining circuit 327 combines these separated chrominance sidebands with luminance signal from the FM detector 313 to generate a composite video signal for application to a video modulator 329. The video modulator 329 modulates the amplitude of a low-level radio-frequency (RF) picture carrier (e.g. for television channel 3 or 4) to provide one of the signals the VCR supplies to a television set.

The VCR also supplies the television set a low-level RF sound carrier modulated in frequency by a sound signal reproduced from the video tape. The apparatus for reproducing the sound signal from the video tape and generating the frequency-modulated RF sound carrier is not depicted in FIG. 6.

Usually the FM detector 313 is of the pulse-counting type. The luminance signal it detects includes vertical synchronizing pulses, horizontal synchronizing pulses, and equalization pulses. A horizontal sync separator 317 separates the horizontal synchronizing pulses for application to a scan line counter 319. A horizontal sync separator 321 separates the vertical synchronizing pulses for application to a field counter 323. The separated vertical sync pulses are also used for resetting the scan line counter 319. The modulo-four scan line count and the modulo-two field count are supplied from the counters 319 and 323 to oscillator 315 to furnish the basis for selecting which of the four phases of 4.21 MHz is to be supplied to the up-converter 325 during the current scan line. The separated horizontal sync pulses are supplied to a burst gate generator 331 which generates a burst gating pulse a prescribed time after the trailing edge of each horizontal sync pulse, which pulse occurs for an interval framing the color burst interval. The burst gate generator 331 may receive the separated vertical sync pulses from vertical sync separator 321 or the scan line count from the line counter 319 in some designs to aid in suppressing the generation of burst gating pulses during vertical blanking intervals. FIG. 6 shows both these connections, although at most only one of these connections would normally be used.

The derivation of the ACC signal applied to the variable gain control amplifier 301 is of particular interest. The chrominance sidebands separated by the 3.58 MHz bandpass filter 351 are applied to an input of an automatic chroma control (ACC) detector circuit 352. The burst gating pulse supplied from the burst gate generator 331 enables the synchronous detection of the color burst portions of the filter 351 response in accordance with a phase-locked 3.58 MHz signal supplied from a source 353 thereof. The ACC signal supplied from the output of the ACC detector 352 is applied to the input of a filter 354. The filter 354 extracts the low-frequency component of the pulses resulting from synchronously detecting color bursts, typically using some form of peak detection of those pulses followed by resistance-capacitance (RC) low-pass filtering with a time constant of a few scan lines. The peak detection may be implemented using sample-and-hold circuitry sampling in response to burst gating pulses supplied from the burst gate generator 331, for example. The response of the filter 354 is applied to a comparator 355 which generates the gain control signal applied to the gain control input terminal of the variable gain control amplifier 301 to control its gain. When the ACC signal exceeds a prescribed level, the gain control signal changes to reduce the gain of the variable gain control amplifier 301 to reduce its gain. In some designs the comparator 355 may be subsumed by or included within the variable gain control amplifier 301 itself.

Figure 1:
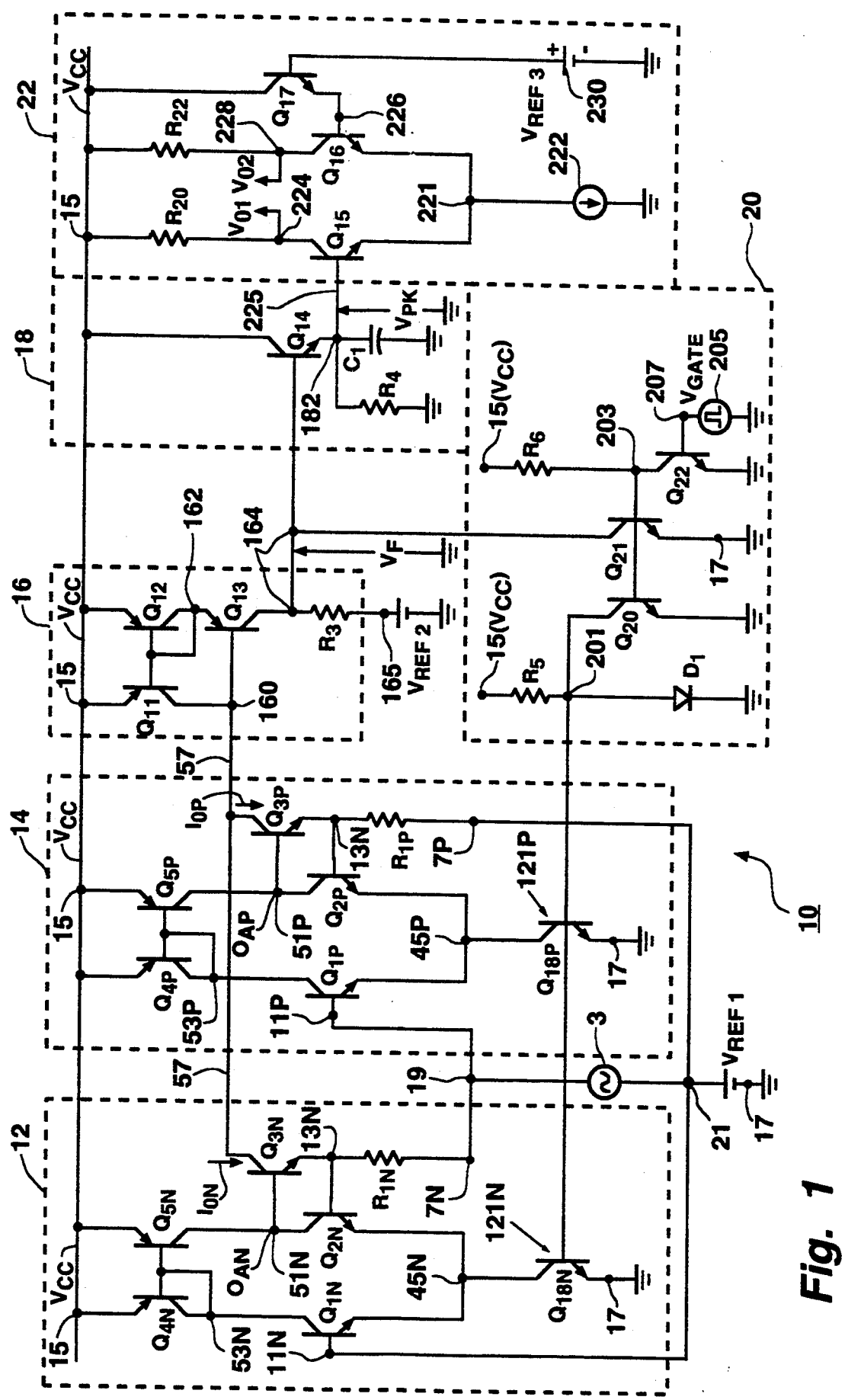
FIG. 1 is a schematic diagram of a novel amplitude peak detector used in the playback system of FIG. 3.
Figure 2:
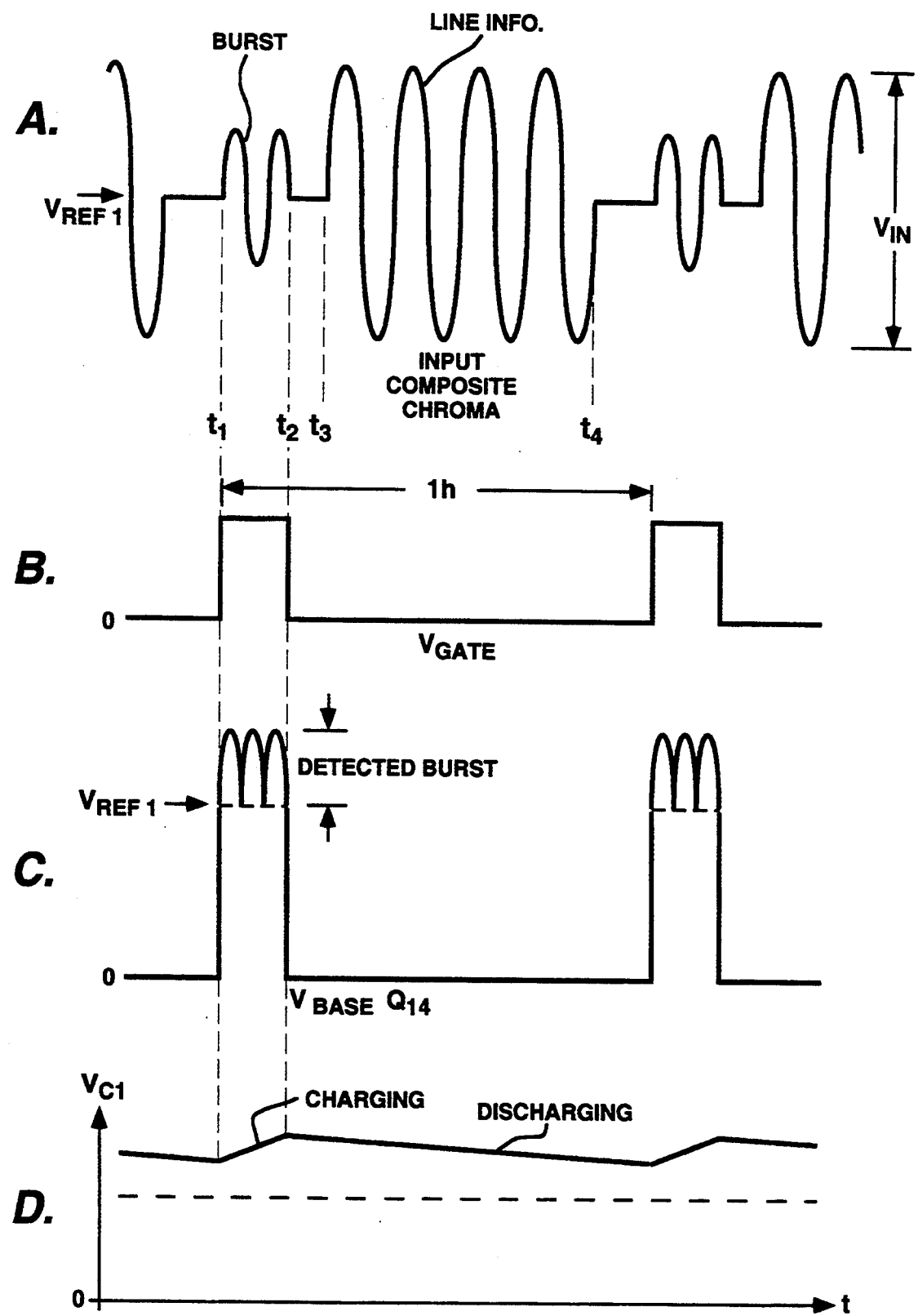
FIG. 2 is a waveform diagram of signals associated with the FIG. 1 amplitude peak detector.
Figure 3:
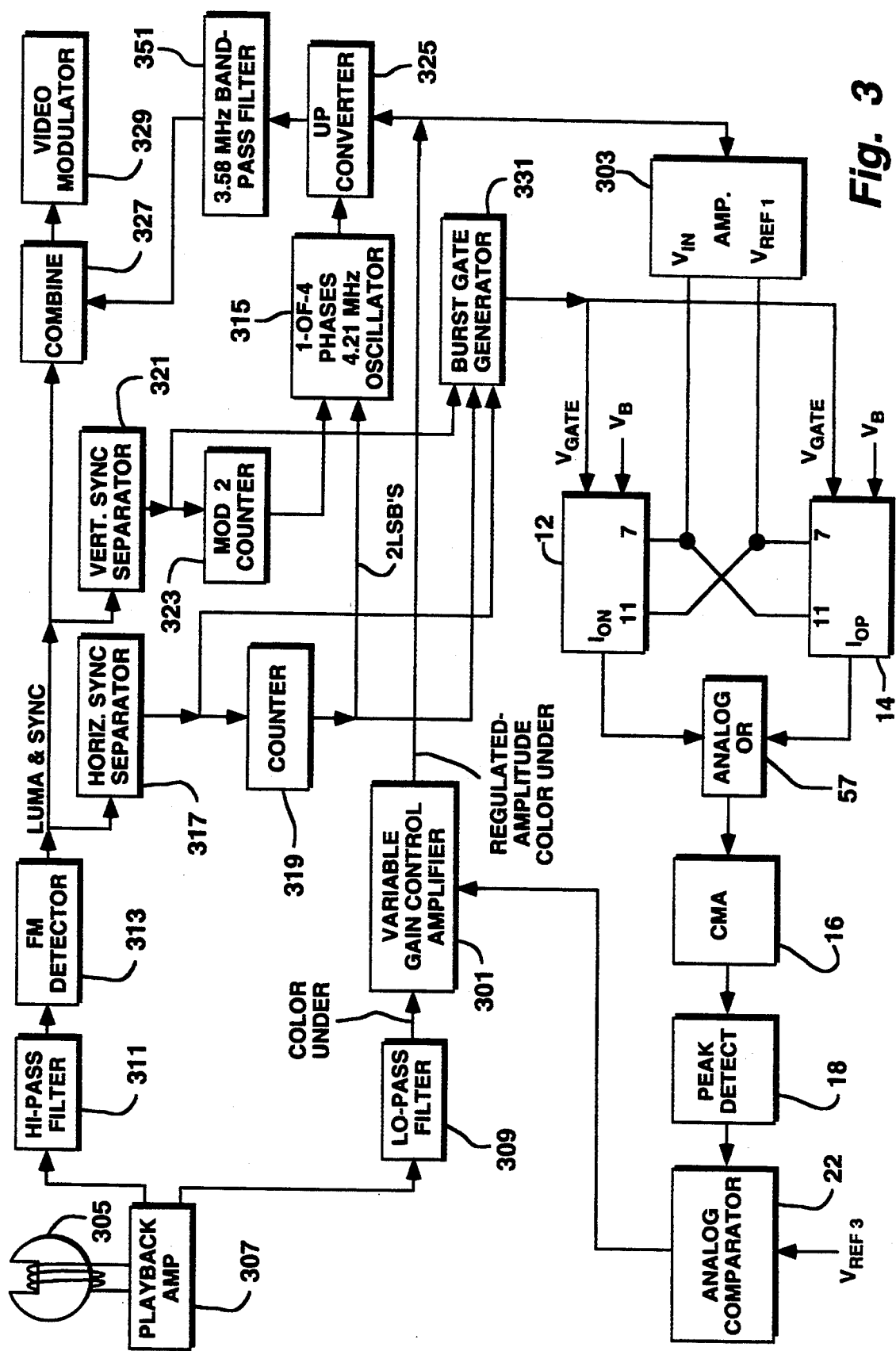
FIG. 3 block diagram of a playback system for a video cassette recorder (VCR) of the VHS type, which playback system embodies the invention.

FIG. 1 is a schematic diagram of a gated detection circuit 10 designed to detect the "BURST" portion of a color-under signal shown in waveform A of FIG. 2 and to produce a DC control voltage for controlling the gain of a variable gain amplifier 301 as shown in FIG. 3. In accordance with the invention, the ACC signal is to be derived from the color-under signal taken directly from the output of the variable gain amplifier 301, rather than from the upconverted response to that signal separated by the 3.58 MHz band-pass filter 351 from the upconverter 325 output signal.

In FIG. 1 the color-under signal, the amplitude and polarity of the "BURST" portion of which is to be detected, is represented as an alternating current (AC) signal $V_{IN}$ produced by a signal source 3 connected between terminals 19 and 23. A reference voltage $V_{REF1}$, which is preferably a direct current (DC) voltage, is applied between terminals 21 and 17. $V_{REF1}$ may be assumed to have a value one-half that of an operating potential $V_{CC}$, which potential $V_{CC}$ may be +5 volts, for example.

The detection circuit 10 of FIG. 1 includes a detector 12 to detect and rectify a negative-going swing of the (AC) signal $V_{IN}$; a detector 14 to detect and rectify a positive-going swing of the (AC) signal $V_{IN}$; a current-to-voltage converter 16; a peak detector circuit 18; a gating and biasing circuit 20 for controlling the turn-on and turn-off of the rectifiers 12 and 14 and of the current-to-voltage converter 16; and an analog comparator 22.

The components of detector 12, which functions as a negative half-wave rectifier, are identified by reference characters followed by the letter "N". The components of detector 14, which functions as a positive half-wave rectifier, are identified by reference characters followed by the letter "P". Detector 12 includes NPN transistors Q1N and Q2N, which are in emitter-coupled differential amplifier connection. That is, the emitters of Q1N and Q2N are connected in common to a node 45N, the base of Q1N is connected to a "non-inverting" input node 11N, the base of Q2N is connected to an "inverting" input node 13N, the collector of Q1N is connected to a node 53N and the collector of Q2N is connected to a node 51N which defines the output (OAN) of the differential amplifier.

A current mirror amplifier (CMA) is connected to the collectors of Q1N and Q2N. The current mirror amplifier includes PNP transistors Q4N and Q5N. Transistors Q4N and Q5N have their emitters connected to a power terminal 15, to which the operating potential $V_{CC}$ is applied. The collector of Q5N is connected to node 51N. The collector and base of Q4N and the base of Q5N are connected to node 53N. This current mirror amplifier connection is such that the collector current supplied by the PNP transistor Q5N to the output node OAN is similar to the collector current demanded by the NPN transistor Q1N from the CMA input node 53N.

A selectively enabled, relatively constant current source 121N is connected between node 45N and ground. The current source 121N includes an NPN transistor Q18N having its collector connected to node 45N, its emitter connected to terminal 17 to which is applied ground potential, and its base connected to a terminal 201 to which is selectively applied a relatively constant bias voltage $V_B$.

Unidirectional current feedback between output OAN at the collector of Q2N and the "inverting" input at the base of Q2N is provided by the common-collector-amplifier action of an NPN transistor Q3N having its base connected to the collector of Q2N and its emitter connected to the base of Q2N. The collector of Q3N is connected to a summing line 57.

An input resistor R1N is connected between terminal 13N and input terminal 7N. As discussed in detail below, terminal 7N, which defines one input terminal of the rectifier 12, is connected to terminal 19; and node 11N, which defines another input terminal of the rectifier, is connected to terminal 21.

The structure of positive-swing detector 14 is substantially the same as that of negative-swing detector 12. Positive swing detector 14 includes NPN transistors Q1P and Q2P which are in emitter-coupled differential amplifier connection. That is, the emitters of Q1P and Q2P are connected in common to a node 45P, the base of Q1P is connected to input node 11P, the base of Q2P is connected to an inverting input node 13P, the collector of Q2P is connected to node 51P defining the output OAP of the differential amplifier and the collector of Q1P is connected to node 53P.

A current mirror amplifier (CMA) is connected to the collectors of Q1P and Q2P. The CMA includes PNP transistors Q4P and Q5P. Q5P is connected at its emitter to power terminal 15 and at its collector to node 51P. The emitter of Q4P is connected to terminal 15; and its collector and the bases of Q4P and Q5P are connected to node 53P. This current mirror amplifier connection is such that the collector current supplied by the PNP transistor Q5P to the output node OAP is similar to the collector current demanded by the NPN transistor Q1P from the CMA input node 53N.

A selectively enabled relatively constant current source 121P is connected to node 45P. Current source 121 includes an NPN transistor Q18P having its collector connected to node 45P, its emitter connected to ground terminal 17 and the relatively constant bias voltage $V_B$ is selectively applied to the base of Q18P.

Unidirectional current feedback is provided between the output OAP at the collector of Q2P and the "inverting" input at the base of Q2P by thee common-collector-amplifier action of an NPN transistor Q3P having its base connected to the collector of Q2P, its collector connected to the summing line 57, and its emitter connected to the base of Q2P. An input resistor R1P is connected between terminal 13P and terminal 7P. Terminal 7P which defines one input terminal of the rectifier 14 is connected to terminal 21, and node 11P which defines another input terminal of rectifier 14 is connected to terminal 19.

On the summing output line 57 the half-wave rectification current $I_{ON}$ produced by negative-swing detector 12 is summed with the half-wave rectification current $I_{OP}$ produced by positive-swing detector 14 in an analog OR or "wired OR" operation. The resulting full-wave rectification current demand on the summing output line 57 is supplied from the input of a current mirror amplifier (CMA) of the type described by Wilson included in a current-to-voltage converter 16. This CMA includes a PNP transistor Q13 having its common-emitter forward current gain stabilized by emitter-to-base current feedback supplied by a component simpler CMA comprising PNP transistors Q11 and Q12 having their emitters connected to terminal 15. The base of Q11 and the base and collector of diode-connected transistor Q12 are connected at a node 162 to receive Q13 emitter current. The summing line 57 connects to the base of Q13 at a node 160, to which the collector of Q11 is connected to supply a negative feedback current proportional to the Q13 emitter current.

The collector of Q13 is connected to a node 164 and produces an output current $I_{C13}$, the amplitude of which is proportional to the full-wave rectification current demanded from the input of the current-to-voltage converter 16. A resistor R3 is connected between node 164 and terminal 165 to which is applied a potential $V_{REF2}$. $I_{C13}$ flows through resistor R3 into reference source $V_{REF2}$. The voltage, $V_F$, at node 164 is then equal to $(I_{C13} R_3) + V_{REF2}$. In the discussion to follow it is assumed that $V_{REF2}$ is the same as $V_{REF1}$.

The peak detector 18 includes an NPN transistor Q14 connected as an emitter follower for positive-going signals, with its collector connected to terminal 15, its base to node 164 and its emitter to node 182. A storage capacitor C1 is connected between node 182 and ground terminal 17 having a value sufficient to hold the peak voltage (VP) at node 182 relatively constant over at least one horizontal line time interval. A discharging resistor R4 is connected in parallel with C1 between node 182 and ground. The value of R4 is selected to assure a slowly decreasing voltage across C1 when no signal is detected.

The output 182 of the peak detector 18 is applied to an input 225 of an analog comparator 22. The comparator 22 compares the output voltage $V_{PK}$ of the peak detector circuit 18 against a reference voltage $V_{REF3}$ to generate output voltages $V_{O1}$ and $V_{O2}$ exhibiting differential variation from each other. The comparator 22 includes NPN transistors Q15 and Q16 in emitter-coupled differential amplifier connection, having their emitters connected in common at node 221. A relatively constant current source 222 is connected between node 221 and ground potential. The base of Q15 is connected to terminal 182, and its collector is connected to an output terminal 224. The base of Q16 is connected to a node 226, and its collector is connected to an output terminal 228. A load resistor R20 is connected between terminal 224 and power terminal 15, and a load resistor R22 is connected between terminals 228 and 15. A biasing signal is applied to Q16 by the emitter-follower action of an NPN transistor Q17 connected at its collector to terminal 15 and at its emitter to node 226, to which the base of Q16 is connected. A reference voltage source 230 producing a reference voltage $V_{REF3}$ is connected to the gate of Q17. $V_{REF3}$ is typically greater than $V_{REF2}$ and less than $V_{CC}$. $V_{REF3}$ typically sets the level at which the comparator 22 responds to the output of the peak detector. The output signals $V_{O1}$ and $V_{O2}$ at terminals 224 and 228 are applied to variable gain amplifier 301 shown in FIG. 3.

The bias voltage $V_B$ is produced by the potential divider comprising a resistor R5 connected between terminals 15 and 201 and a diode D1 connected between terminal 201 and ground. Diode D1 is poled to conduct current in the forward direction from terminal 201 to ground, whereby the bias voltage $V_B$ developed at terminal 201 is equal to the forward voltage drop, $V_F$, of diode D1 at a particular current. Terminal 201 is connected to the bases of Q18N and Q18P and the voltage at 201 sets the current level through these transistors.

Gating circuitry 20 includes means for controlling the generation and application of the bias voltage $V_B$ and means for selectively either clamping summing output node 164 to ground or letting it respond to the AC input signal.

The gating circuit 20 includes a resistor R6 connected between terminals 15 and 203. An NPN transistor Q21 is connected at its base to node 203, at its collector to node 164, and at its emitter to ground terminal 17. An NPN transistor Q20 also has its base connected to terminal 203 and its emitter grounded; the collector of Q20 is connected to bias terminal 201. An NPN transistor Q22 has its collector connected to terminal 203 and its emitter grounded, and its base is connected to a gating terminal 207 to which is applied a source 205 of gating signals.

When the gating signal produced by source 205 is "high" (i.e. sufficiently high to drive transistor Q22 fully on) transistor Q22 is turned-on and clamps the bases of Q21 and Q20 at or close to ground. This turns off conduction through Q20 and Q21. Q20 being turned-off allows current to flow from $V_{CC}$ supply via R5 into diode D1, establishing a forward conduction voltage $V_B$ across diode D1, which voltage $V_B$ is applied to the bases of Q18N and Q18P. So biased, the negative-swing detector 12 and the positive-swing detector 14 are rendered operative. Concurrently, the turn-off of Q21 removes the clamp to ground applied to node 164 and enables the voltage at node 164 to develop a level proportional to the current produced at the joined outputs of negative-swing detector 12 and the positive-swing detector 14. When enabled, the combination of the negative-swing detector 12, the positive-swing detector 14 and the current-to-voltage converter 16 functions as a full-wave rectifier; and the voltage output at node 164 will vary in accordance with the output signals produced by the swing detectors 12 and 14.

When the gating signal is "low" (at or close to zero volts) Q22 is turned-off. Current then flows via R6 into the base of Q21 turning-on conduction through the collector-to-emitter path of Q21 to clamp node 164 at or close to ground potential. Concurrently, current also flows via R6 into the base of Q20 turning-on conduction through the collector-to-emitter path of Q20 to clamp the bases of Q18N and Q18P at, or close, to ground potential. Conduction through Q18N and conduction through Q18P are turned-off, to disable the negative-swing detector 12 and the positive-swing detector 14. Concurrently, the turn-on of Q21 clamps node 164 to ground, preventing any current flow into the peak detector. Thus, when the gate source signal is "high" the full-wave rectifier is enabled and when the gate source signal is low, the full-wave rectifier is disabled.

The operation of the circuit of FIG. 1 will now be examined for the condition when the gating signal is "high" with transistors Q21 and Q20 turned-off. For this condition the voltage $V_B$ is applied to the bases of Q18N and Q18P. The swing detectors 12 and 14 are identical except for the application of the color-under signal $V_{IN}$, the amplitude and polarity of the "BURST" portion of which is to be detected, being to their signal input terminals 13N and 11P, respectively, and for the reference voltage $V_{REF1}$ being applied to their input terminals 11N and 13P, respectively. Since the DC bias condition and response of detector 14 is essentially identical to that of detector 12, the detailed description of their respective modes of operation will be offered with reference to FIG. 5, which shows a single detector redrawn without using either of the suffices "N" and "P".

Figure 5:
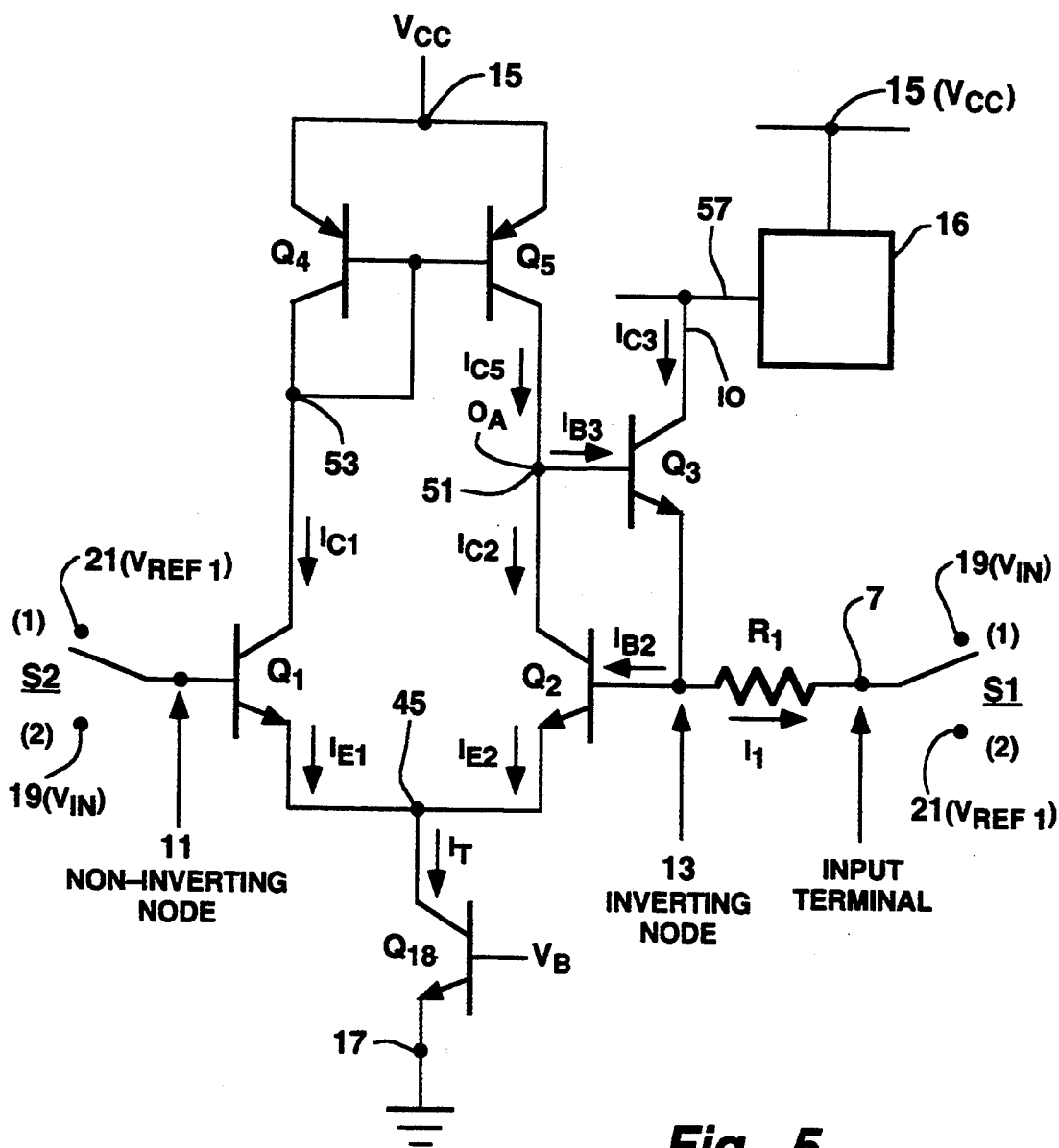
FIG. 5 is a schematic diagram referred to in this specification when explaining portions of the FIG. 3 playback system.

In FIG. 5, switches S1 and S2 are used to indicate two signal conditions. For condition (1) input terminal 7 is connected to terminal 19 to which is applied the AC signal $V_{IN}$ and node 11 is connected to terminal 21 to which is applied $V_{REF1}$. This condition corresponds to the operation of detector 12. For condition (2) input terminal 7 is connected to terminal 21 to which is applied $V_{REF1}$ and node 11 is connected to terminal 19 to which is applied $V_{IN}$. This condition corresponds to the operation of detector 14.

When $V_B$ is applied to the base of Q18 a relatively constant current $I_T$ is caused to flow via the collector-to-emitter path of Q18 from node 45 to ground. Assume that a voltage $V_{REF1}$ which is a direct current (DC) voltage and which, for purpose of illustration is assumed to equal $V_{CC}/2$, is applied to the base of Q1. Concurrently, assume that an AC signal $V_{IN}$ varying about $V_{REF1}$ ($V_{IN}+V_{REF1}$) is applied to terminal 7 and then via resistor R1 to the base of Q2. Assuming that initially $V_{IN}$ is equal to zero, it may be assumed that $V_{REF1}$ is initially applied to both the bases of the differential pair of transistors Q2N and Q1N. Assuming Q2N and Q1N to have similar operating characteristics it is evident that, for $V_{IN}=0$, the emitter current $I_{E1}$ of Q1N is equal to the emitter current $I_{E2}$ of Q2N and that $I_T = I_{E1}+I_{E2}$. It may also be assumed that the collector current $I_{C1}$ of Q1 is equal to the collector current $I_{C2}$ of Q2. Assuming Q4 and Q5 to have similar geometries and similar operating characteristics, the collector current drawn by Q1 and flowing through Q4 will induce a like amplitude current to flow through Q5. Neglecting base currents, the collector current from Q4 is approximately equal to the collector current demanded by Q1 and the collector current from Q5 is equal to the collector current demanded by Q2. (In this specification, it is assumed that the forward current gain $\beta$ of the transistors is relatively high and that base current can, to a first approximation, be ignored.)

Hence, for the condition of $V_{IN}=0$ and for $V_{REF1}$ applied to terminals 11 and 7, the bases of Q1 and Q2 are at $V_{REF1}$, the emitter current through Q3 is (at most) equal to a small base current flowing through Q2 divided by the $\beta$ of Q3. Hence, for $V_{IN}$ equal to zero, the output collector current $I_{C3}$ of Q3 may be assumed to be essentially equal to zero. That is, the output current $I_O$ to the summing line 57 as determined by $I_{C3}$ is essentially equal to zero.

The above analysis applies for the DC bias conditions of detectors 12 and 14. Hence for $V_{IN}=0$, the output currents $I_{ON}$ of detector 12 and $I_{OP}$ of detector 14 are, at or close, to zero. The response of the circuit of FIG. 1 and in particular the operation of the detector circuits 12 and 14 will now be analyzed for the conditions wherein $V_{IN}$ goes negative relative to $V_{REF1}$ and wherein $V_{IN}$ goes positive relative to $V_{REF1}$.

Referring back to FIG. 5, first consider a condition (1) where the switch S1 applies $V_{IN}$ to terminal 7 and the switch S2 applies $V_{REF}$ to terminal 11, implementing detector circuit 12 operation.

When $V_{IN}$ goes negative with switches S1 and S2 set to condition (1)—i.e. the signal at terminal 7 goes negative relative to the signal at node 11—the voltage at the base of Q2 goes negative relative to the voltage at the base of Q1. The voltage at node 45 tends to remain unchanged, following (with a forward-conduction base-emitter junction voltage offset provided by Q1) the higher voltage $V_{REF1}$ present at the base of Q1. The voltage at node 45 being held up tends to decrease the base-to-emitter voltage of Q2 and thus decrease conduction through Q2. However, concurrently, the current $I_{C1}$ demanded by Q1 from the node 53 increases, tending to increase the currents $I_{B4}$ and $I_{B5}$ flowing to node 53 from the bases of Q4 and Q5 and thence the current $I_{C4}$ flowing to node 53 from the collector of Q4 until the $I_{C1}$ current demand is fulfilled. By current mirror action, the collector current $I_{C5}$ supplied by Q5 increases together with the collector current $I_{C4}$ supplied by Q4. Since conduction through Q2 is decreasing, the increasing $I_{C5}$ current tends to flow as an increased $I_{B3}$ current flow into the base of Q3. The increased $I_{B3}$ current flow into the base of Q3 is multiplied by the ($\beta+1$) common-collector gain of Q3 in the current flowing from the emitter of Q3 into node 13. The emitter current of Q3 flows primarily through the resistor R1 to cause a voltage drop thereacross, which voltage drop increases sufficiently to overcome for the most part the tendency for the base-to-emitter voltage of Q2 to be reduced responsive to $V_{IN}$ at the terminal 7 going negative. Conduction through Q2 is increased, to divert such portion of the increased collector current $I_{C4}$ supplied by Q4 from the base of Q3 as required to keep $I_{B3}$ just large enough so the emitter current $I_{E3}$ from Q3 maintains a voltage drop across R1 substantially equal to ($V_{REF1}-V_{IN}$). That is, the effect of the current feedback to node 13 is that some of the current $I_{E3}$ flows into the base of Q2 and the current levels through Q1 and Q2 are readjusted such that the voltage at node 13 will be maintained at, or close to, the voltage at node 11.

This closed-loop analysis shows that, for node 11 at $V_{REF1}$, when the signal at input terminal 7 tends to decrease the voltage at inverting node 13, Q3 will provide sufficient feedback to maintain node 13 at or close to $V_{REF1}$ by withdrawing current therefrom via resistor R1. For the condition of $V_{REF1}$ applied to node 11 and for the AC signal varying negatively about $V_{REF1}$, node 13 functions as a virtual AC ground and will tend to stay at $V_{REF1}$.

Since Q3 can supply all the current needed at node 13 to maintain node 13 equal to $V_{REF1}$, it is evident that as $V_{IN}$ applied to input terminal 7 goes negative, the current flowing through resistor R1 will equal ($V_{REF1}-V_{IN}$)/$R_1$, where $R_1$ is the resistance of R1. Thus the current ($I_1$) through R1 will increase linearly as the AC signal increases in the negative direction. It is also evident that the output current ($I_O$) which is identical to $I_{C3}$ of Q3 is essentially equal to the current $I_1$ through R1, since the collector and emitter currents of a bipolar transistor are related in $\beta$: ($\beta+1$) ratio and the $\beta$ of an NPN monolithic-integrated-circuit transistor is normally at least 30.

When $V_{IN}$ goes positive with switches S1 and S2 set to condition (1)—i.e. the signal at terminal 7 goes positive relative to the signal at node 11—a current tends to flow from terminal 7 via R1 into the base of Q2. Q2 now tends to conduct more than Q1 and to reduce conduction through Q1. The tendency towards reduced conduction through Q1 is accompanied by tendencies for reduced conduction through Q4 and through Q5 as well. At the same time, as the conduction through Q2 increases, it tends to pull more collector current from node 51 and to divert current from flowing into the base of Q3, thus tending to cut off conduction through Q3. Also, Q2 goes into saturated conduction, decreasing the voltage across the base-emitter junction of Q3 below the level to maintain that junction conducting. Therefore, as $V_{IN}$ at terminal 7 goes positive relative to $V_{REF1}$ at terminal 11, conduction through Q3 is turned off; and no current demand is presented to the summing line 57 by Q3.

Thus, it has been shown that the negative-swing detector 12 produces an output current, $I_{ON}$, which increases linearly with $V_{IN}$, when $V_{IN}$ goes negative relative to $V_{REF1}$. Its output current, $I_{ON}$, has been shown to equal zero when $V_{IN}$ increases and goes positive relative to $V_{REF1}$.

The operation of the positive-swing detector 14 is now explained referring again to FIG. 5, but with switches S1 and S2 set to a condition (2). That is, the switch S1 applies $V_{REF}$ to terminal 7 and the switch S2 applies $V_{IN}$ to the non-inverting node 11, implementing detector circuit 14 operation.

When $V_{IN}$ goes positive with switches S1 and S2 set to condition (2)—i.e., the potential at node 11 is more positive than the potential at terminal 7—the base of Q1 goes positive with respective to the base of Q2 tending to turn-off Q2. However, as the voltage on the base of Q1 increases, its collector current $I_{C1}$ increases. This increased collector current is mirrored via Q4 and Q5 causing an increase in $I_{C2}+I_{B3}$. Since Q2 tends towards being turned-off, the increased current tends to flow into the base of Q3, causing increases in the emitter current $I_{E3}$ of Q3 into node 13 and in the collector current $I_{C3}$ of Q3. The increased current into node 13 raises the voltage at the base of Q2 to a value which is approximately equal to the value of the potential $V_{IN}$ at node 11. Since node 13 is equal to $V_{IN}$ and since input terminal 7 is at $V_{REF1}$, the current $I_1$ flowing through R1 is equal to $(V_{IN}-V_{REF})/R_1$. The current through R1 flows from the emitter of Q3, giving rise to an essentially equal collector current $I_{C3}$.

When $V_{IN}$ goes negative with switches S1 and S2 set to condition (2)—i.e., the potential at node 11 is more negative than the potential at terminal 7—the base of Q1 goes negative relative to the base of Q2. Since conduction through Q1 decreases, the currents through Q4 and Q5 also decrease. Thus, as transistor Q2 conducts more current, it tends to withdraw more current from node 51, cutting off conduction through the collector-to-emitter path of Q3.

Therefore, analysis of the circuit of FIG. 5 indicates that Q3 supplies sufficient current to maintain the voltage at node 13 equal to the voltage at node 11. For the condition when the input terminal 7 goes negative and node 13 is held at $V_{REF1}$, the current through R1 and Q3 is equal to $(V_{REF1}-V_{IN})/R_1$. Similarly, when the input terminal is held at $V_{REF1}$ and the potential at node 13 rises with $V_{IN}$, the current flows in the same direction through R1 and Q3 and is equal to $(V_{IN}-V_{REF1})/R_1$. Thus, the positive-swing detector 14 of FIG. 1 has been shown to produce an output current $I_{OP}$ which increases linearly with $V_{IN}$ when $V_{IN}$ goes positive relative to $V_{REF}$. The positive-swing detector 14 has been shown to produce an output current $I_{OP}$ which is equal to zero when $V_{IN}$ goes negative relative to $V_{REF1}$. It should also be evident that detectors 12 and 14 can respond to very small signal differentials. Referring back to FIG. 1, on the summing output line 57, the half-wave rectification current $I_{ON}$ produced by negative-swing detector 12 is summed with the half-wave rectification current $I_{OP}$ produced by positive-swing detector 14 in an analog OR or "wired OR" operation. The resulting full-wave rectification current demand on the summing output line 57 is supplied from the input of the current-to-voltage converter 16.

Figure 4:
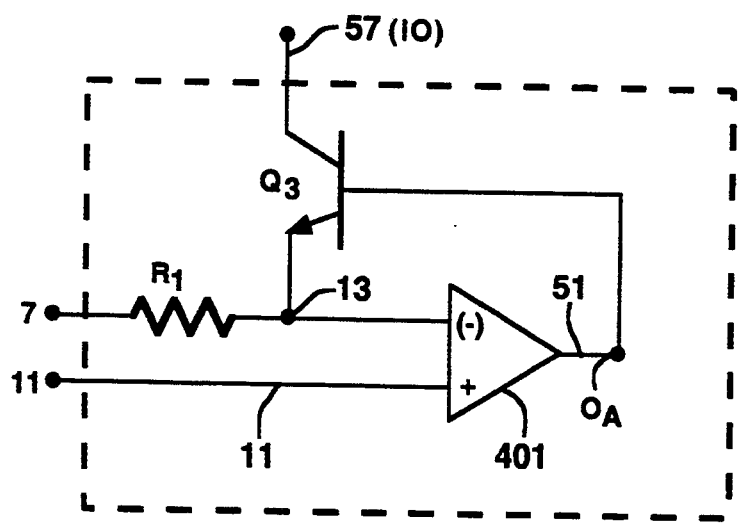
FIG. 4 is a symbolic representation of the FIG. 1 amplitude peak detector.

FIG. 4 represents in a still more general way than FIG. 5 either one of the swing detectors 12 and 14. The FIG. 4 circuit may be viewed more generally than being a rectifier, as being a clipper. The transistors Q1, Q2, Q4, Q5, and Q18 of the FIG. 5 circuit (when turned-on) together behave like an operational amplifier (op-amp) 401, as shown in the FIG. 4 clipper or swing detector. The base of Q1 corresponds to the op-amp 401 non-inverting (+) input, the base of Q2 corresponds to the op-amp 401 inverting (−) input, and the node 51 between the collectors of Q2 and Q5 corresponds to the output OA of the op-amp 401. The op-amp 401 is an operational transconductance amplifier (OTA) in the FIG. 5 embodiment of the clipper or swing detector. The node or terminal bearing the prefix "11" defines the non-inverting node or terminal (+) of the op-amp 401, which also is one of two input terminals of the FIG. 4 clipper or swing detector. The node or terminal bearing the prefix "13" defines the inverting (−) node (or terminal) of the op-amp 401.

In the FIG. 4 clipper or swing detector considered as a whole, the node or terminal bearing the prefix "11" is one of two input terminals thereto. The node 13 is an internal node which functions as a virtual ground. Resistor R1 connects between node 13 and a terminal bearing the prefix "7" which is the other input terminal of the FIG. 4 clipper or swing detector.

The op-amp 401 is provided degenerative feedback from its output OA to its inverting (−) input 13 by a feedback amplifier having an input connection from the output OA of the op-amp 401 and having a non-inverting output connection to node 13 with the resistor R1 as a load. The feedback amplifier has a further output connection to the output terminal of the FIG. 4 clipper or swing detector, shown in FIG. 4 as an inverting output connection (IO). The feedback amplifier is shown in FIG. 4 as a common-collector-amplifier or emitter-follower connection of Q3 with the resistor R1 as an emitter load and with the further output connection being from the collector of Q3 to the inverting output connection (IO) of the FIG. 4 clipper or swing detector.

The feedback amplifier provided by the bipolar transistor Q3 connected as a common-collector amplifier, with the resistor R1 as an emitter load, can be viewed as being a transresistance amplifier, with Q3 functioning as a current amplifying device for driving the resistor R1 as a current-to-voltage conversion element.

FIG. 3 shows the playback system for a video cassette recorder (VCR) of the VHS type, modified to develop directly from the color-under signal an ACC signal for application to the variable gain control amplifier 301. As shown in FIG. 3 and detailed below, the playback system embodying the invention includes means (305, 307, 309, 311, 313) for sensing the luminance information and chroma information recorded in a video recording medium and for separating the luminance information from the chroma information. The playback system includes means (317, 321) for separating the horizontal and vertical synchronizing information included in the luminance information. The playback system also includes burst gate generator means (331) responsive to the separated horizontal and vertical synchronizing information for determining the occurences of burst intervals in the separated chroma information and generating burst gate signals during those occurences. A variable gain control amplifier means (301) responds to the separated chroma information with a gain that is controlled in response to a control signal, thereby to generate controlled-gain separated chroma information. The separated chroma information and color burst signals at the output of the variable gain control amplifier are rectified by means (303, 12, 14, 16, 18) which are selectively enabled during burst gate interval for peak detecting the color burst signal to generate a peak detection result. Means (18) are provided comparing the peak detection result to a prescribed level for generating a control signal applied to the variable gain control amplifier (301) for completing an automatic gain control loop that functions as an automatic color control (ACC) loop.

The variable gain control amplifier 301 is advantageously of the type described by the inventor in his allowed U.S. patent application Ser. No. 07.896,442 filed Jun. 10, 1992, entitled "CONTROLLED GAIN AMPLIFIER WITHOUT DC SHIFT OR SIGNAL PHASE REVERSAL IN LOAD CURRENT" and assigned to Samsung Electronics, Co., Ltd. The variable gain control amplifier 301 has its gain controlled by an ACC loop that includes, in addition to the variable gain control amplifier 301: an amplifier 303 responding to the color-under signal from amplifier 301 for supplying that signal as referred to the reference voltage $V_{REF1}$, a full-wave rectifier comprising the detectors 12 and 14 for the burst portions of the color-under signal so referred, a current-to-voltage converter 16 responding to full-wave rectified color-under signal color-synchronizing burst signal being withdrawn therefrom by detectors 12 and 14 to supply a full-wave rectified burst voltage added to a pedestal voltage $V_{REF2}$, a peak detector 18 responding to the full-wave rectified burst supplied from the current-to-voltage converter 16 to generate a signal measuring the amplitude of the color-under signal, and a comparator 22 for-generating a gain control signal for the variable gain control amplifier 301 depending upon the amount the signal measuring the amplitude of the color-under signal tends to exceed a reference voltage $V_{REF3}$.

The ACC is keyed in nature, with the detectors 12 and 14 being enabled only when supplied a burst gating pulse at the time color burst occurs. The burst gating pulses in the signal $V_{GATE}$ are generated by a burst gate generator 331 similar to that in the prior-art playback system shown in FIG. 6. The keyed ACC of FIG. 3 differs from that in the FIG. 6 prior-art playback system in that the color burst is detected at 629 kHz from the color-under signal before its up-conversion, rather than being detected at 3.58 MHz after the up-conversion. The detection of color burst at 629 kHz from the color-under signal is more difficult to accomplish than the customary detection of color burst at 3.58 MHz, however, since there is a reduction in the number of cycles available for detection during the burst gate interval. Only one-and-a-half cycles of color burst occur at 629 kHz during the burst gate interval of each scan line. It is no longer convenient to achieve noise-immunity by using keyed synchronous detection. The detection of the peaks of these few cycles of 629 kHz color burst presents more problem than the customary detection of color burst at 3.58 MHz.

The operation of the half-wave rectifiers 12 and 14 and the current-to-voltage converter 16 as part of the FIG. 3 chroma burst detector system is more easily explained with reference to the waveform diagram of FIG. 2. Waveform A of FIG. 2 is the AC input signal, $V_{IN}$, applied between terminals 19 and 21 of FIG. 1. Waveform A, which represents the color-under signal referred to $V_{REF1}$ produced at the output of an amplifier 303 shown in FIG. 3, includes a "BURST" signal that occurs between times $t_1$ and $t_2$ and a line information signal that occurs between time $t_3$ and $t_4$. The line information signal comprises QAM sidebands encoding two color-difference signals. The "BURST" signal occurring at a frequency of 629 kHz is a reference signal, and it is important that it be properly detected to control the gain of the amplifier 301.

Referring to the portion of waveform A identified as ""Burst"", note that the "BURST" signal is an alternating current (AC) signal which goes positive and negative with respect to $V_{REF1}$ and has an amplitude that may range from a few millivolts to more than a volt. Waveform B is a gating signal $V_{GATE}$ which goes high from time $t_1$ to $t_2$. Waveform B is supplied from the burst gate generator 331 of FIG. 3; in FIG. 1 this waveform is generated by the source 205 and applied to terminal 207. As discussed above when $V_{GATE}$ is high, the half-wave rectifiers 12 and 14 are enabled, and when $V_{GATE}$ is low, the half-wave rectifiers 12 and 14 are disabled. Consequently, only when $V_{GATE}$ is high are the positive and negative excursions of the "BURST" signal detected as discussed above, to produce a full-wave detected signal superposed on $V_{REF2}$, as shown in waveform C of FIG. 2.

The full-wave rectified signal ($V_{FN}$) superposed on $V_{REF2}$ is the signal which is generated at node 164 in the FIG. 1 circuitry in response to a "BURST" signal of the type shown in waveform A. The $V_{FN}$ signal at 164 is applied to the base of peak detector transistor Q14, which by emitter-follower action charges capacitor C1 to the value of the signal at node 164 (less a $V_{BE}$ drop).

The voltage ($V_{PK}$) at the output 182 of peak detector 18 increases during a gating period, when $V_{GATE}$ is high, as shown in waveform D of FIG. 2. Following the end of the gating period, the charging capacitor C1 discharges slowly via R4 and the input conductance of the comparator 22, as shown in waveform D. The values of C1 and R4 (and the input conductance of comparator 22) are such that C1 discharges very slowly.

As noted above, during the gating period $t_1$ to $t_2$, conduction through Q20 and conduction through Q21 are turned-off. After the gating period is over (gate signal is low), Q21 conduction through is turned-on to clamp node 164 and the base of Q14 at or close to ground potential. This prevents any signal from being fed from current-to-voltage converter 16 to the peak detector and thence therethrough to capacitor C1.

The output $V_{PK}$ of the peak detector is applied to the base of Q15 which defines one input of a differential amplifier comprised of Q15, Q16. A reference voltage $V_{REF3}$ is applied to the base of Q17, the emitter voltage ($V_{REF3} - V_{BE}$) of which is applied to the base of Q16 in emitter-coupled differential amplifier connection with Q15. Thus, when the voltage $V_{PK}$ at node 182 is greater than the voltage at the base of Q16, Q15 conducts and the voltage $V_{01}$ at its collector is less than the voltage $V_{02}$ at the collector of Q16. On the other hand, when the voltage at node 182 is less than the voltage at the base of Q16, $V_{01}$ is greater than $V_{02}$. The push-pull voltages $V_{01}$ and $V_{02}$ may be used to control the gain of a amplifier 301 as shown in FIG. 3 and to perform other control functions.

The FIG. 1 amplitude peak detector can alternatively be used to detect the peak amplitude of color burst in an ACC loop where 3.58 MHz color burst is detected. Unlike a keyed synchronous detector, the FIG. 1 amplitude peak detector is not noise-immune. However, the reduction of the amplitude of color-difference signals during noisy conditions is sometimes deliberately sought by VCR and TV set designers. The FIG. 1 amplitude peak detector is simply modified to provide keyed synchronous detection where it is desired. This can be done by connecting the end of the resistor R5 remote from the node 201, not to the continuous operating potential $V_{CC}$, but rather to an operating potential $V_{CC}$ chopped to zero at 3.58 MHz rate. Alternatively, a source of 3.58 MHz square wave current may be applied to the node 201.

When construing the claims which follow, bear in mind that one skilled in the art will be enabled by acquaintance with the foregoing specification to design a number of variants of the preferred embodiments particularly described and claimed. Such variants are intended to be included within the scope of the broader ones on the following claims.

What is claimed is:

1. Apparatus for playing back from a video recording medium recorded with luminance information and with chroma information, the recorded chroma information being at frequencies below those of chroma information in a composite video signal of the type transmitted by a standard broadcast television signal, the luminance information including horizontal and vertical synchronizing information, and the chroma information including during burst intervals color burst signals at a frequency below that of color burst signals in said composite video signal of the type transmitted by said standard broadcast television signal, said apparatus comprising:

means for sensing the luminance information and chroma information recorded in said recording medium, the chroma information so sensed being at said frequencies below those of chroma information in a composite video signal of the type transmitted by a standard broadcast television signal;

means responsive to the luminance information for separating the horizontal and vertical synchronizing information included in the luminance information;

burst gate generator means responding to the separated horizontal and vertical synchronizing information for generating burst gate signals which concur with the occurrences of respective burst intervals in the chroma information;

an amplifier, responding to the chroma information at said frequencies below those of chroma information in a composite video signal of the type transmitted by a standard broadcast television signal, with a gain that is controlled in response to a control signal, for generating controlled-gain chroma information that is at said frequencies below those of chroma information in a composite video signal of the type transmitted by a standard broadcast television signal and that includes therein color burst signals at said frequency below that of color burst signals in said composite video signal of the type transmitted by said standard broadcast television signal;

means, receptive of said controlled-gain chroma information, that is at said frequencies below those of chroma information in a composite video signal of the type transmitted by-a standard broadcast television signal selectively responding to said controlled-gain chroma information as enabled by said burst gate signals, for peak detecting said color burst signals that are included in said controlled-gain chroma information and that are at said frequency below that of color burst signals in said composite video signal of the type transmitted by said standard broadcast television signal, said peak detecting being done without conversion of the frequencies of said controlled-gain chroma information and the color burst signals therein to the frequencies of chroma information and color burst signals in said composite video signal of the type transmitted by said standard broadcast television signal, said peak detecting being done without synchronous detection at said frequency of color burst signals in said composite video signal of the type transmitted by said standard broadcast television signal, said peak detecting being done to generate a peak detection result; and means for comparing the peak detection result to a prescribed level to generate said control signal, said control signal being applied to said generating means to complete an automatic gain control loop.

2. Apparatus for playing back from a video recording medium as set forth in claim 1 of a type for playing back from a tape recorded in accordance with the VHS standard, wherein said luminance information frequency modulates a luminance carrier wave to generate a frequency modulation signal most of the energy of which falls into a prescribed first band of frequencies, and wherein said chroma information is a color-under signal contained within a prescribed second band of frequencies below said first band of frequencies.

3. Apparatus for playing back from a video recording medium as set forth in claim 1, wherein said means for peak detecting said color burst signal peak detects them on an absolute value basis and comprises:

means selectively responsive to said controlled-gain chroma information, as enabled by said burst gate signals, for generating a first half-wave rectification response to negative excursions of said color burst signals;

means selectively responsive to said controlled-gain chroma information, as enabled by said burst gate signals, for generating a second half-wave rectification response to positive excursions of said color burst signals;

means for combining said first and second half-wave rectification responses to obtain a full-wave rectification response to said color burst signals; and means for peak detecting said full-wave rectification response to said color burst signals, for outputting said peak detection result.

4. Apparatus for playing back from a video recording medium as set forth in claim 1, wherein most of the energy of said luminance information falls into a prescribed first band of frequencies, wherein said chroma information is a color-under signal contained within a prescribed second band of frequencies below said first band of frequencies, and wherein said means for peak detecting said color burst signals peak detects said color burst signals while they are within said prescribed second band of frequencies below said first band of frequencies.

5. Apparatus for playing back from a video recording medium recorded with luminance information and with chroma information, the recorded chroma information being at frequencies below those of chroma information in a composite video signal of the type transmitted by a standard broadcast television signal, the recorded luminance information including horizontal and vertical synchronizing information, and the recorded chroma information including during burst intervals a reference chroma signal of a prescribed frequency below that of color burst signals in said composite video signal of the type transmitted by said standard broadcast television signal, apparatus comprising:

means for sensing the luminance information and chroma information recorded in said video recording medium, the chroma information so sensed being at said frequencies below those of chroma information in a composite video signal of the type transmitted by a standard broadcast television signal;

means responsive to the luminance information for separating the horizontal and vertical synchronizing information included in the luminance information;

burst gate generator means responsive to the horizontal and vertical synchronizing information for generating burst gate signals which concur with the occurrences of respective burst intervals in the chroma information ;

a variable gain control amplifier having a signal input, a signal output, and a gain control terminal, said amplifier responding to the chroma information with a gain that is controlled in response to a gain control voltage signal for generating at its signal output controlled-gain chroma information at said frequencies below those of chroma information in a composite video signal of the type transmitted by a standard broadcast television signal, said controlled-gain chroma information including during burst intervals said reference chroma signal of said prescribed frequency; and rectifying and peak detecting means receptive of the signal output of said variable gain amplifier, at said frequencies below those of chroma information in a composite video signal of the type transmitted by a standard broadcast television signal, enabled during the burst intervals in the chroma information, for rectifying and peak detecting the reference chroma signal of said prescribed frequency included in the signal output of said variable gain amplifier, and in response thereto supplying said gain control voltage signal to the gain control terminal of the variable gain control amplifier, said rectifying and peak detecting the reference chroma signal being done without upconverting the reference chroma signal from said prescribed frequency to a higher frequency.

6. The combination as claimed in claim 9 wherein said rectifying means comprises:

a detecting amplifier having a non-inverting input node, an inverting input node, and an output node;

a current feedback amplifying means connected between said output node and said inverting input node for providing negative feedback therebetween and for supplying current into said inverting input node tending to maintain the potential at said inverting node equal to the potential at said non-inverting node;

a resistive element having an ohmic value;

that is connected between said inverting input node and an input terminal; and means for applying a reference voltage to one of said non-inverting input node and said input terminal and for applying a signal derived from the output of said variable gain control amplifier to the other one of said non-inverting input node and said input terminal.

7. The combination as claimed in claim 6, wherein said current amplifying means includes a transistor having first and second electrodes defining the ends of a main conduction path and a control electrode, and wherein said first electrode is connected to said inverting node and said control electrode is connected to said output node.

8. The combination as claimed in claim 6 wherein said detecting amplifier includes first and second differentially connected transistors and said current feedback amplifying means includes a third transistor, wherein each transistor has first and second electrodes defining the ends of a conduction path and a control electrode;

wherein said first electrode of said first and second transistors are connected in common and via a current source to a first point of operating potential;

wherein the control electrode of said first transistor is connected to said non-inverting input node;

wherein the control electrode of said second transistor and the first electrode of said third transistor are connected to said inverting input node; and wherein said second electrode of said second transistor and the control electrode of said third transistor are connected to said output node.

9. The combination as claimed in claim 8 wherein said amplifier includes a current mirror comprising fourth and fifth transistors; each transistor having first and second electrodes defining the ends of a conduction path and a control electrode;

means connecting the conduction path of the fourth transistor between the second electrode of the first transistor and a second point of operating potential and the conduction path of the fifth transistor between the second electrode of the second transistor and said second point of operating potential; and means connecting the control electrodes of said fourth and fifth transistors to the second electrode of said first transistor.

10. In a video playback apparatus reproducing luminance information and with chroma information at frequencies below those in a standard broadcast television signal and generating horizontal and vertical synchronizing signals, the chroma information including during burst intervals color burst signals at a frequency below that in said standard broadcast television signal line information, and a reference chroma signal of a predetermined frequency, said chroma information being supplied to an up-converter producing an up-converted chroma signal via a low pass filter and a variable gain control amplifier, said variable gain control amplifier being directly connected to said up-converter, a control loop comprising:

the variable gain control amplifier receiving a filtered chroma signal from said low pass filter and generating a gain controlled chroma signal supplied to said up converter, wherein said amplifier includes a gain control terminal for reception of, a gain control voltage, and wherein gain of said gain controlled chroma signal is controlled in response to said gain control voltage signal;

a rectifier circuit receiving said gain controlled chroma signal and generating at least one rectified chroma signal responsive to said horizontal and said vertical synchronizing signals applied to said rectifier circuit so as to enable said rectifier circuit during the burst intervals in the chroma information; and a peak detector receiving a detector input signal representative of said rectified chroma signal for generating said gain control voltage signal responsive to detected peaks in said detector input signal.

11. The control loop as recited in claim 10, wherein said rectifier circuit comprises positive and negative half-wave rectifiers.

* * * * *